United States Patent [19]

Sedlmayr

[11] Patent Number: 4,518,174
[45] Date of Patent: May 21, 1985

[54] APPARATUS FOR ADJUSTING THE HEIGHT OF THE FIXING OR GUIDE FITTING FOR THE SHOULDER BELT OF A SAFETY BELT SYSTEM

[75] Inventor: Gerhard Sedlmayr, Hamburg, Fed. Rep. of Germany

[73] Assignee: Autoflug GmbH, Relligen, Fed. Rep. of Germany

[21] Appl. No.: 444,698

[22] Filed: Nov. 26, 1982

[30] Foreign Application Priority Data

Nov. 26, 1981 [DE] Fed. Rep. of Germany ....... 3146918

[51] Int. Cl.$^3$ ............................................. A62B 35/02
[52] U.S. Cl. .................................................. 280/808
[58] Field of Search ........................ 280/801, 804, 808; 297/483, 486

[56] References Cited

U.S. PATENT DOCUMENTS

| 3,875,556 | 4/1975 | Beaird | 280/801 |
| 4,039,224 | 8/1977 | Baver et al. | 280/804 |
| 4,056,282 | 11/1977 | Nordh | 297/483 |

FOREIGN PATENT DOCUMENTS

| 2366096 | 11/1978 | Fed. Rep. of Germany | 297/483 |
| 2720789 | 11/1978 | Fed. Rep. of Germany | 280/808 |
| 2738140 | 3/1979 | Fed. Rep. of Germany | 280/801 |

Primary Examiner—Joseph F. Peters, Jr.
Assistant Examiner—Ross Weaver
Attorney, Agent, or Firm—Becker & Becker, Inc.

[57] ABSTRACT

An apparatus for adjusting the height of the upper fixing or guide fitting for the shoulder belt of a safety belt system, particularly in motor vehicles. The apparatus has a mechanism for automatically adjusting the vertical position of the fitting to the sitting position of the person who is to be strapped in, and there is the problem that a strict correlation between the setting of the seat in question and the vertical position of the associated fixing or guide fitting cannot take account of every combination of physical proportions and sitting positions to produce an optimum belt angle at which the belt meets the shoulder of the wearer. One reason for this is that even the associated columns or uprights of cars vary in their positions. In order to solve the problem of providing an apparatus of this kind which makes it possible to determine the optimum path of the shoulder belt independently of any given seat positions, there is proposed according to the invention an apparatus for sensing the belt in terms of at least one parameter of its effective connection to the wearer, and for initiating a reaction to the situation found. The apparatus may be constructed to sense the direction of travel of the belt, or to sense and measure the force with which the belt rests on the body of the occupant.

24 Claims, 4 Drawing Figures

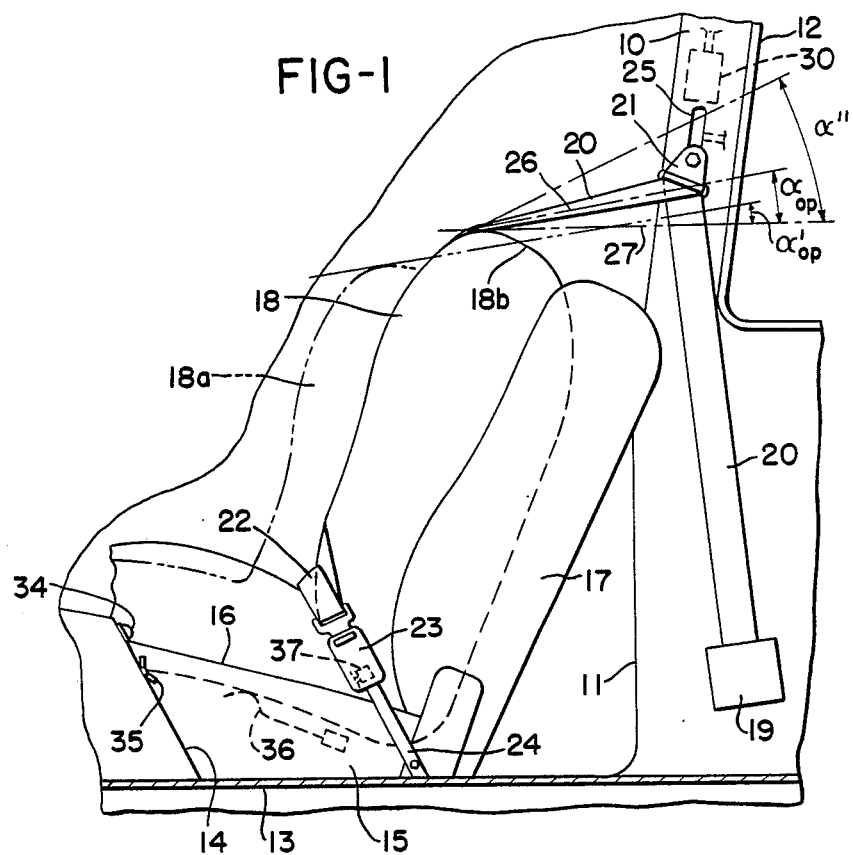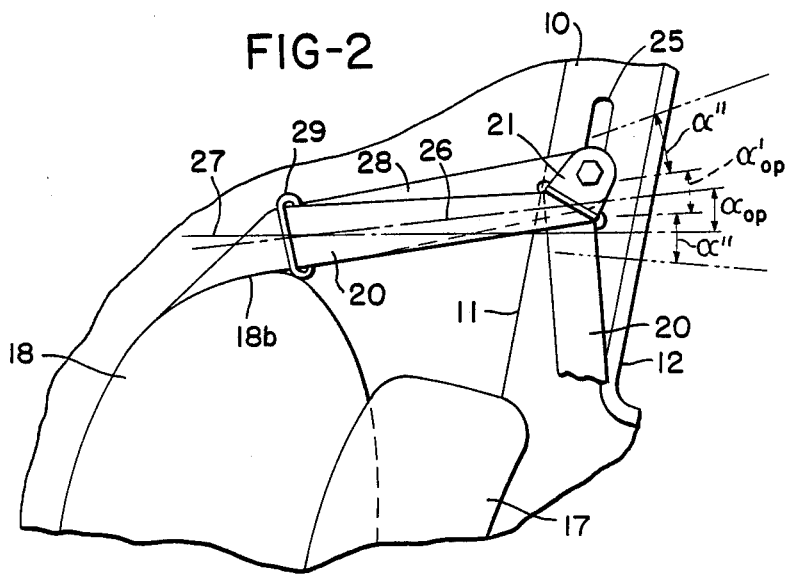

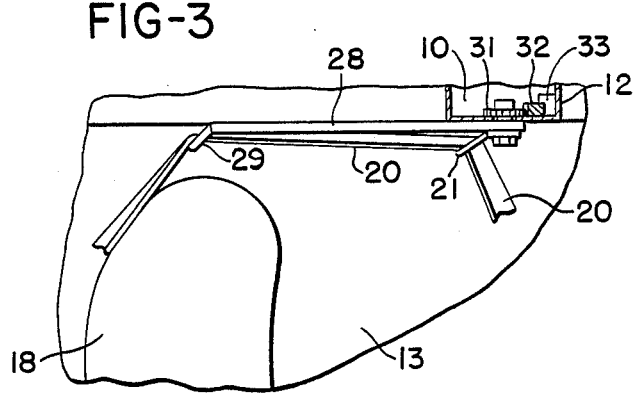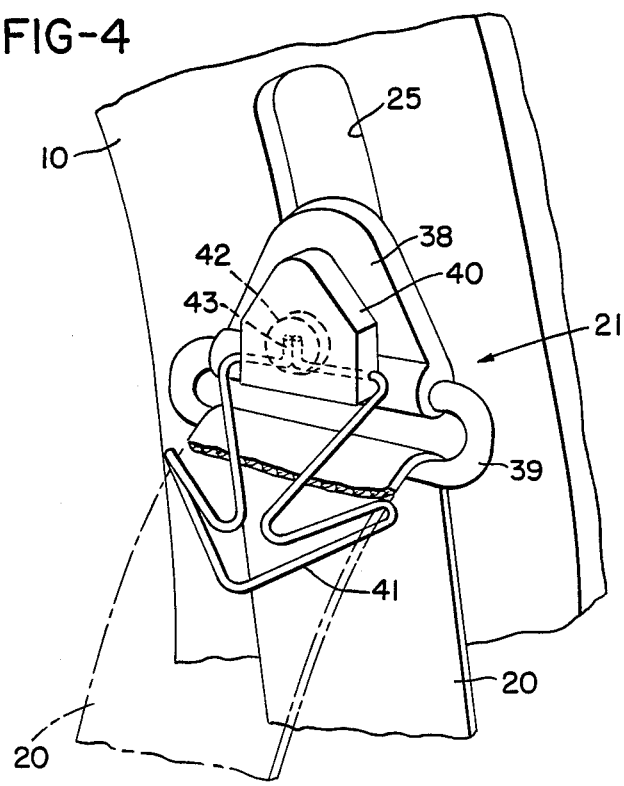

APPARATUS FOR ADJUSTING THE HEIGHT OF THE FIXING OR GUIDE FITTING FOR THE SHOULDER BELT OF A SAFETY BELT SYSTEM

BACKGROUND OF THE INVENTION

The present invention relates to an apparatus for adjusting the height of the upper fixing or guide fitting for the shoulder belt of a safety belt system, particularly in motor vehicles, with means for preferably automatically adapting the vertical position of the fixing or guide fitting to the sitting position of the person who is to wear the belt.

In German Offenlegungsschriften Nos. 26 25 417 and 28 34 837, various aspects are discussed with regard to the dependency of the vertical position of the fixing or guide fitting for the shoulder belt in a vehicle safety belt system on the horizontal and vertical position of the associated individual seat, and the aim, in terms of both the object and solution is to obtain the most favorable path of the safety belt from the fixing or guide fitting to the shoulder of the person in question. German Offenlegungsschrift No. 28 34 837 also states that the path of the belt is determined not only by the actual position of the seat, but also by the particular proportions of the individual wearer, which are characterized by the expressions "seated giant" and "seated dwarf".

In order to overcome the problem described in these specifications, it is proposed therein that each position of the seat in question be associated with a corresponding vertical position of the fixing or guide fitting, both as a function of horizontal adjustments of the seat, and also of vertical adjustments, so that, for example, a person with long legs and a short trunk, who will therefore adjust the seat to be far back and as high as possible, will have an associated upper anchoring point for the shoulder belt which is comparatively higher than would be provided for a person of normal build, who would also have the seat pushed back but not so high.

As a result of the strict correlation between the selected position of the seat in question and the vertical position of the associated fixing or guide fitting in the known apparatus, not only are those conditions with regard to physical proportions and/or the seat position which do not fit into the described scheme or are not to be subordinated to this scheme eliminated, but also the known proposed solutions require complicated and heavy constructions, which require considerable maintenance, the widespread introduction of which must appear questionable, if only on grounds of cost.

U.S. Pat. No. 4,039,224—Bauer et al dated Aug. 2, 1977 is also concerned with the problem of the favorable path of the safety belt from the shoulder of the wearer to the fixing or guide fitting on the body of the vehicle. This prior art relates to a passive buckling-on system, wherein the safety belt is automatically applied when the person has taken a position on the vehicle seat. Depending on the size and sitting position of the wearer, the fixing point for the safety belt located diagonally above the shoulder is appropriately determined and finally adjusted in one go. No further adjustments can then be made unless the person climbs out of the vehicle. The setting as such is obtained by means of a retaining member which moves in the direction of travel of the belt when the safety belt is automatically applied and thus engages a locking element. Since this latter element can only lock in a certain position, the setting in this known apparatus starts not from the belt but from the given locking position of the locking member. As a result, continuous adaptation to changes in the position of the wearer are impossible.

European patent application No. 00 24 446 discloses an apparatus for adjusting the vertical position of the upper fixing or guide fitting, wherein a lever is provided which is pivotable about an axis extending approximately in the longitudinal direction of the vehicle, in a plane at right angles to the longitudinal axis of the vehicle, while the tip of the lever on which the safety belt engages describes more or less a semicircle, when pivoted inside the vehicle, from the topmost to the lowest position. Admittedly, this enables the fixing or guide point to be brought into two or three different vertical positions, but the path of the belt is changed, in the transverse direction of the vehicle, so that, at worst, the belt will be brought into contact with the neck of the wearer. This could have very dangerous consequences, quite apart from the fact that the contact of the hard edge of the belt on the neck is uncomfortable.

It is therefore an object of the present invention to provide an apparatus for the purpose described hereinbefore, which makes it possible to determine the optimum path of the shoulder belt, independently of any given sitting positions, particularly simply, by means of manual setting, with the aid of a servomotor, or even automatically.

BRIEF DESCRIPTION OF THE DRAWINGS

This object, and other objects and advantages of the present invention, will appear more clearly from the following specification in connection with the accompanying drawings, in which:

FIG. 1 schematically shows a side view of a front seat in a vehicle with the associated B-column of the car body and a safety belt put on by an occupant;

FIG. 2 shows a detail from the view in FIG. 1, in the region of the occupant's shoulder;

FIG. 3 is a plan view of the subject matter of FIG. 2; and

FIG. 4 shows a part of the B-column with a guide fitting and an apparatus for determining the bearing force of the belt.

SUMMARY OF THE INVENTION

The apparatus of the present invention is characterized primarily by an apparatus which is provided in addition to the fixing or guide fitting, for sensing the belt in terms of at least one parameter of its operative connection to the person strapped in, and for triggering a reaction to the situation ascertained.

According to advantageous embodiments and further inventive features, the additional apparatus may be an apparatus for sensing the direction of travel which the belt takes between the fixing or guide fitting and the person.

The additional apparatus may also be an apparatus for sensing and measuring the force with which the belt rests on the body, particularly the shoulder, of the person.

On the fixing or guide fitting, there may be provided a special sensing arm, the free end of which is connected to the belt, and the angular position of which is determined relative to a reference line. The inventive apparatus may include a mechanical angle measuring device, or an electrical or electronic angle measuring device. The angle measured may be converted into an electrical impulse which activates a known servo element, for example a servomotor, to move the fitting until a given angular position of the sensing arm relative to the reference line is obtained. A delay element may be incorporated in the angle measuring device to suppress any variations in the angular position below a given range, for example between zero and six degrees, so that only angular changes above this range are passed on to the servo element in order to move the fitting.

An apparatus may be included for measuring the force with which the sensing arm is moved counter to the force of a spring from a basic position into the associated angular position.

A sensor may be provided which measures the bearing force of the belt and passes it on as a measured value. The sensor may be in the form of a pressure gauge which is mounted on the fixing or guide fitting and is acted upon by a lever which is connected to a sensing means which detects the tension of the belt.

The reaction triggered by the results obtained may comprise a signal which is easily comprehended by the human brain, for example light and/or noise, which causes the person to effect manual adjustment of the height of the fixing or guide fitting.

The signal may indicate, by means of directional symbols or script, the direction in which the vertical adjustment of the fixing or guide fitting should be made.

The noise signal may comprise electronic speech which informs the person of the direction in which the fixing or guide fitting must be vertically adjusted.

For the manual adjustment of the height of the fixing or guide fitting, a handwheel may be provided near the fitting in a manner known per se.

For manual adjustment of the height of the fixing or guide fitting, an electric switch may be provided which activates a servo element, for example a servomotor, known per se, in order to move the fitting.

A fully automatic reaction of the inventive apparatus may be provided to the results obtained from the sensing operation, so as to adjust the fixing or guide fitting to the predetermined correct height.

The control action of the sensing device can be switched off by means of a buckle and/or seat contact switch when the safety belt is not being worn.

Alternatively, the control action of the sensing means can be switched off by means of a configuration of the sensing element which prevents such action when the safety belt is not being worn.

On the pivot axis of the sensing arm, there may be provided a ring gear, for example in the form of a pinion, which meshes with a toothed rack which acts on a sensor, for example by induction. The pivot axis of the sensing arm may coincide with the axis of rotation of the fixing or guide fitting. The inventive apparatus may be constructed as a component of a safety belt which is integral with the seat. This may include the sensing of the shoulder belts of a four-point belt of the braces-type construction.

The vertical setting of the fixing or guide fitting as such may be signalled in a manner which is easily comprehended by human senses, preferably optically, for example by a lamp, a series of lamps, or a luminous dial on the dashboard of the vehicle, to indicate the existing state.

An advantage obtained with the invention is that the occupant of the vehicle can adjust his seat in the horizontal and vertical directions, and incline the backrest, in the manner most comfortable for him, without thereby automatically determining the vertical position of the fixing or guide fitting for the shoulder belt of the safety belt. In fact, the angle of inclination of the back rest, in particular, can alter the circumstances considerably, and it should also be borne in mind that, in many vehicles, it is possible to adjust the steering wheel horizontally and vertically, as a result of which even people of normal proportions can obtain seat positions which would normally only be used by seated dwarves, but which would give the person of normal build the advantage of a wider view over the vehicle, for example.

Thus, the apparatus according to the invention comes close to satisfying a requirement which was recently emphasized in the German newspaper "WZ Westdeutsche Zeitung" of Nov. 14, 1981 under the headline "Belts still have their defects", namely that requirement of adapting the belt individually to the physical build and figure of the wearer, in particular. The direction of travel of the shoulder belt at the point where it makes contact with the shoulder of the wearer is particularly important in many respects, namely, on the one hand in terms of holding the body back in the event of an accident and, on the other hand with respect to preventing harm or injury to the wearer caused by the belt itself. If, for example, the belt extends too steeply to the shoulder, its restraining effect is impaired, whereas if the path of the belt is too flat, this can cause damage to the spinal column. The "optimum belt angle" is therefore of critical importance in each individual case; it cannot and should not be subordinated to any scheme. Here, the invention offers a possible solution, which is also viable, in terms of expense, for mass production.

The general teaching of the invention is that, after the belt has been put on, the wearer should determine the situation with regard to the direction in which the shoulder belt extends from its upper fixing or guide point and makes contact with the shoulder and hence the body of the wearer. If it is found that the actual position does not correspond to the desirable optimum, this is brought to the wearer's attention, so that he can react by making a correction, i.e. the person in question is encouraged to try to establish the desired conditions. For this, the simplest possible means, or even fully automatic means, must be provided to ensure that the incidence of belt wearing is not affected by the usual reluctance to take any additional action. Moreover, a signal emitted by the safety belt may help to heighten the general awareness of the advisability of putting on the belt.

The invention has the additional advantage that it is also suitable for achieving a better belt configuration for people of various sizes sitting on the back seats of passenger cars. Since the back seats are generally not horizontally or vertically movable, and the angle of the back rest cannot be adjusted, the various physical proportions of the occupants are particularly critical when there is a fixed upper fixing or guide point for the shoulder belt on the C-column or D-column, since in practice the optimum belt angle is obtained only for a single build, which corresponds to the norm. The passengers on the back seats are therefore particularly dependent on being able to adjust the belt correctly, since they usually have to accept the seat in the position in which it is built-in.

DESCRIPTION OF THE PREFERRED EMBODIMENTS

Referring now to the drawings in detail, according to FIG. 1, a vehicle body has a B-column 10, a front door opening 11, a side rear window 12, a floor 13, and a gear housing 14. In the region of the door opening 11 is provided a separate front seat 15 with a seat area 16 and back rest 17. On the seat 15 there sits a large person 18 or a small person 18a. This person is strapped in by a three-point safety belt, which essentially comprises a belt reeling mechanism 19, a shoulder strap or belt 20, a guide fitting 21, a pelvic belt 22, a buckle 23, and an anchoring portion 24. The anchoring portion 24 is inherently rigid, flexible, and is secured to the seat 15. The seat can be adjusted into three positions.

The persons 18,18a are shown in highly diagrammatic form, without a head or neck, since the important point here is the position of the shoulder 18b, with which the shoulder belt 20 coming from the guide fitting 21 makes contact, so as to extend from there in the usual way diagonally over the chest and abdomen of the wearer down to the tongue of the buckle 23, at which point the belt is reversed in the opposite direction and is guided, as a pelvic belt 22, to the third fixing point. Since the guide fitting 21 on the B-column 10 is adjustable in height in a slot-shaped guide 25, the belt of the shoulder belt 20 can extend, in a more or less diagonally downward direction, from the guide fitting 21 to the shoulder 18b of the person in question. The inclined position is here defined as the angle alpha, which is enclosed by the central longitudinal axis 26 of the taut shoulder belt 20 with an associated horizontal 27. This angle alpha has an optimum value (index op), at least in theory, for every build of person in conjunction with every seat position.

As can be seen from FIGS. 1 and 2, the height of the guide fitting 21 is adjusted therein in such a way that the shoulder belt 20 makes contact with the shoulder 18b of the large person 18 at the optimum belt angle alpha op. For the small person 18a, the optimum angle alpha' op would be the same as for the large person 18, although the guide fitting 21 would have to be adjusted lower down in its guide 25. The belt angle alpha" shown in FIG. 1 is too large and therefore unfavorable, and should be rejected on safety grounds.

For determining the optimum belt angle, i.e. for determining the actual state of the belt angle alpha and correcting it, if necessary, until the optimum is obtained as the desired state, sensing means are provided which are shown in FIGS. 2 to 4. According to FIGS. 2 and 3, a sensing arm 28 is pivotably mounted on the guide fitting 21, the fixed end of this sensing arm 21 being located coaxial with the axis of rotation of the guide fitting 21, while the free end of the arm 28 has a loop 29 through which the shoulder belt 20 passes. When the height of the guide fitting 21 is adjusted in the guide slot 25 in the B-column 10, for example by means of an electric motor 30, the fixed end of the sensing arm 28 moves in the same way upwardly or downwardly along the guide slot 25. As a result of the sensing arm 28 being connected to the guide fitting 21 on the one hand, and indirectly to the shoulder 18b of the person on the other hand, the position of the sensing arm 28 defines the belt angle alpha which the shoulder belt 20 assumes in its path. Thus, the sensing arm is suitable as an indicator of the belt angle, i.e. the arm 28 provides a corresponding parameter. As shown in FIG. 3, this parameter can be displayed by means of a ring gear 31 and a toothed rack 32 which meshes therewith, so as to act inductively, for example, on a sensor 33, this display being in the form of a number or an image (symbol), preferably by means of a lamp 34 which is easily visible to the seat occupant in question, e.g. on the gear housing 14 or on the dashboard. Alternatively or simultaneously, the sensor 33 may also produce a noise which lasts until the belt angle has been optimally adjusted. It is also possible for direct instructions for suitable action to be given by means of electronic speech.

When the occupant sees the lamp 34 light up, and has ascertained, from the associated symbol or other signal, the direction in which he must adjust the guide fitting 21, he actuates a corresponding switch 35 on the gear housing 14 or on the dashboard (not shown) so as to adjust the height of the guide fitting 21 in the guide slot 25 by means of the motor 30 until the optimum belt angle alpha has been attained. This is indicated by the dimming of the lamp 34, or in some other way. Obviously, it may be that no signal is released if the belt angle is already at the correct level. This will generally be the case whenever a vehicle is driven predominantly by the same person. Thus the personal effort involved in obtaining the optimum belt angle is normally extremely slight, and indeed practically zero. Furthermore, this effort can be avoided altogether if the adjustment of the optimum belt angle by vertical adjustment of the guide fitting 21 in the guide slot 25 is effected fully automatically, with the sensor 33 producing adjustment movements of the motor 30, by means of a suitable electrical circuit, until the sensor stops releasing adjusting signals.

In order to switch off the signalling action of the sensor 33 at times when the safety belt is not in use, i.e. in particular when there is nobody sitting on the seat 15, a sitting area contact switch 36, or a switch 37 incorporated in the belt buckle 23, is provided, for example, both of which may also be coupled to a general signal (light or sound) which gives an instruction to put on the safety belt as such. In the position where the belt is not in use, i.e. where the belt reeling mechanism 19 has rolled the belt up in the usual way and pulled it tight so that the tongue abuts on the loop 29, the sensing arm 28 must be able to hang down along the B-column 10 so as not to get in the way as people climb into and out of the vehicle, during which time there should be no signal emitted as an instruction to adjust the belt angle to the optimum belt angle alpha. Only when the person 18 sits down on the sitting area 16 and thus depresses the seat contact switch 36 is the sensor 33 activated.

According to FIG. 4, the apparatus may also be constructed so that it starts from the force with which the shoulder belt 20 rests on the shoulder 18b of the wearer. This force will be greater the smaller the belt angle alpha, i.e. as a rule the lower the vertical position of the fixing or guide fitting on the B-column 10.

According to FIG. 4, the guide fitting 21 comprises a bracket 38 and a loop 39 for the shoulder belt 20 which passes through it. The bracket 38 is mounted so as to be vertically adjustable, by means which are not shown, in the guide slot 25 in the B-column 10. Thus far, the construction shown in FIG. 4 corresponds to that shown in FIGS. 1 and 2. On the outside of the bracket 38 is provided a scoop 40 which serves, on the one hand, for the pivotal mounting of the sensing element 41 which may be, for example, bent from wire or made of plastics, and on the other hand to receive a pressure gauge 42 which is acted upon by an angular bend 43 in the sensing element 41. The sensing element 41 is otherwise arrow-shaped, and is formed so as to embrace the shoulder belt 20 at the top and bottom so that even very small changes in the tension of the belt are detected by the apparatus and can be transmitted to the pressure gauge 42 as the sensor. The sensing element 41 also reacts essentially to the direction of the shoulder belt 20 between the guide fitting 21 and the shoulder 18b, but is intended to respond to the pressure which the belt exerts detectably as it runs over the body of the wearer. The gauge 42 then, like the sensor 33 in FIG. 3, signals that the belt angle is wrong, and hence that the fitting 21 is in the wrong vertical position in the guide slot 25 on the B-column 10, by means of the lamp 34 or the like, to make the occupant aware of this so that he can correct the situation and obtain the optimum belt angle alpha. Similarly, it is possible to use the signal emitted by the pressure gauge 42 for automatically adjusting the height of the fitting 21.

When the safety belt is in the nonused position (taken off position), either the control action of the sensing member 41 may be switched off by means of the switches 36 or 37 mentioned hereinbefore, or the angle lever 43 is suitably shaped so as to lift away from the pressure gauge 42 when the shoulder belt 20 is just extending downwardly under the effect of the belt reeling mechanism 19 on the B-column 10.

In the case of safety belts which are integral with the seat, for example of the braces-type construction, the function of the B-column 10 is performed by the side posts of the backrest of the seat in question, which are extended upwards accordingly for this purpose. Although the upper fixing or guide fittings are adjusted together with the back rest, the angle of inclination of the back rest must also be taken into account in this case since the body of the wearer and the back rest form a parallelogram, if only a very narrow one. Certainly, there is then no longer any need to consider the point that the position of the B-column also plays a part in determining the optimum belt angle, which is important in conventional seats without an integral safety belt, not only for their adjustment in the horizontal and vertical direction, but also with regard to the angle of the back rest.

The present invention is, of course, in no way restricted to the specific disclosure of the specification and drawings, but also encompasses any modifications within the scope of the appended claims.

What I claim is:

1. An apparatus for adjusting the height of the upper fixing or guide fitting for the shoulder strap of a safety belt system, said apparatus including means for adapting the vertical position of said fixing or guide fitting to the sitting position of the person which is to wear the safety belt; the improvement comprising:
    a sensing apparatus associated with said fitting for sensing said shoulder strap in terms of at least one parameter of its operative connection to the person which is strapped, and for triggering a reaction, from said adapting means, to the situation ascertained;
    said sensing apparatus having a sensing arm for sensing the direction of travel which said shoulder strap takes between said fitting and the person;
    said sensing arm having a first end connected to said fitting, and a second free end which is connected to said shoulder strap;
    said sensing apparatus having an angle measuring device for determining the angular position of said sensing arm relative to a reference line, and a servo element as said means for adapting the vertical position of said fitting; and
    said servo element being activated to move said fitting until a given angular position of said sensing arm relative to said reference line is obtained, the angle measured by said device for determining the angular position of said sensing arm being converted into an electrical impulse which activates said servo element to move said fitting continuously adjusting shoulder belt location.

2. An apparatus according to claim 1, in which said sensing apparatus is an apparatus for sensing the direction of travel which said shoulder strap takes between said fitting and the person.

3. An apparatus according to claim 2, in which said sensing apparatus is a sensing arm having a first end connected to said fitting, and a second free end which is connected to said shoulder strap; and which includes an angle measuring device for determining the angular position of said sensing arm relative to a reference line.

4. An apparatus according to claim 3, which includes a servo element as said means for adapting the vertical position of said fitting, and in which the angle measured by said device for determining the angular position of said sensing arm is converted into an electrical impulse which activates said servo element to move said fitting until a given angular position of said sensing arm relative to said reference line is obtained.

5. An apparatus according to claim 4, which includes a delay element which is incorporated in said angle measuring device to suppress any variations in the angular position below a given range, so that only angular changes above this range are passed on to said servo element in order to move said fitting.

6. An apparatus for adjusting the height of the upper fixing or guide fitting for the shoulder strap of a safety belt system, said apparatus including means for adapting the vertical position of said fixing or guide fitting to the sitting position of the person who is to wear the safety belt; the improvement comprising:
    a sensing apparatus associated with said fitting for sensing said shoulder strap in terms of at least one parameter of its operative connection to the person who is strapped, and for triggering a reaction, from said adapting means, to the situation ascertained;
    said sensing apparatus being an apparatus for sensing the direction of travel which said shoulder strap takes between said fitting and the person;
    said sensing apparatus being a sensing arm having a first end connected to said fitting, and a second free end which is connected to said shoulder strap; and which includes an angle measuring device for determining the angular position of said sensing arm relative to a reference line; and
    an apparatus for measuring the force with which said sensing arm is moved counter to the force of a spring from a basic position into the associated angular position.

7. An apparatus for adjusting the height of the upper fixing or guide fitting for the shoulder strap of a safety belt system, said apparatus including means for adapting the vertical position of said fixing or guide fitting to the sitting position of the person which is to wear the safety belt; the improvement comprising:

a sensing apparatus associated with said fitting for sensing said shoulder strap in terms of at least one parameter of its operative connection to the person which is strapped, and for triggering a reaction, from said adapting means, to the situation ascertained; and said sensing apparatus being an apparatus for sensing and measuring the force with which said shoulder strap rests on the body of the person.

8. An apparatus according to claim 7, which includes a sensor associated with said sensing apparatus for measuring the bearing force of said shoulder strap and for passing this force on as a measured value.

9. An apparatus according to claim 8, in which said sensor is in the form of a pressure gauge.

10. An apparatus according to claim 9, in which said sensing apparatus includes a lever, and in which said pressure gauge is mounted on said fitting and is acted upon by said lever.

11. An apparatus according to claim 7, in which said means for adapting the vertical position of said fitting are manually adjustable adapting means, and said reaction triggered by said sensing apparatus in response to the situation ascertained comprising a signal which is easily comprehended by the human brain, and which motivates the person to activate said manually adjustable adapting means.

12. An apparatus according to claim 11, in which said signal, by means of directional symbols or script, indicates the direction in which the vertical adjustment of said fitting should be made.

13. An apparatus according to claim 11, in which said signal is a noise signal comprising electronic speech which informs the person of the direction in which said fitting must be vertically adjusted.

14. An apparatus according to claim 11, in which said manually adjustable adapting means includes a handwheel which is provided in the vicinity of said fitting.

15. An apparatus according to claim 11, which includes a servo element, and in which said manually adjustable adapting means includes an electric switch for activating said servo element in order to move said fitting.

16. An apparatus according to claim 7, in which said reaction to the results obtained from said sensing apparatus is fully automatic for adjustment of said fitting to a predetermined correct height.

17. An apparatus according to claim 7, which includes means for switching off the control action of said sensing apparatus when said safety belt is not being worn.

18. An apparatus according to claim 7, in which said sensing apparatus has a switching-off configuration to prevent control action thereof when said safety belt is not being worn.

19. An apparatus for adjusting the height of the upper fixing or guide fitting for the shoulder strap of a safety belt system, said apparatus including means for adapting the vertical position of said fixing or guide fitting to the sitting position of the person who is to wear the safety belt; the improvement comprising:

a sensing apparatus associated with said fitting for sensing said shoulder strap in terms of at least one parameter of its operative connection to the person which is strapped, and for triggering a reaction, from said adapting means, to the situation ascertained;

said sensing apparatus being an apparatus for sensing the direction of travel which said shoulder strap takes between said fitting and the person;

said sensing apparatus being a sensing arm having a first end connected to said fitting, and a second free end which is connected to said shoulder strap; and which includes an angle measuring device for determining the angular position of said sensing arm relative to a reference line; and a ring gear which is provided on the pivot axis of said sensing arm, and which meshes with a toothed rack which acts on a sensor.

20. An apparatus according to claim 19, in which the pivot axis of said sensing arm coincides with the axis of rotation of said fitting.

21. An apparatus according to claim 7, which is constructed as a component of a safety belt which is integral with a seat.

22. An apparatus according to claim 21, in which said shouldr straps are part of a four-point safety belt of the braces-type construction.

23. An apparatus according to claim 7, which includes signal means, in a form easily comprehended by human senses, for indicating the existing state of the vertical setting of said fitting.

24. An apparatus according to claim 23, in which said signal means are optical signal means.

* * * * *